United States Patent [19]

Hagg et al.

[11] Patent Number: 5,422,318
[45] Date of Patent: Jun. 6, 1995

[54] GLASS-CERAMICS AND COLOR PACKAGE

[75] Inventors: Sandra L. Hagg, Corning; Robert W. Pfitzenmaier, Canisteo; Charles C. Smith, Jr., Corning, all of N.Y.

[73] Assignee: Corning Incorporated, Corning, N.Y.

[21] Appl. No.: 258,271

[22] Filed: Jun. 10, 1994

[51] Int. Cl.6 .............................................. C03C 10/14
[52] U.S. Cl. .......................................... 501/4; 501/69
[58] Field of Search ...................................... 501/4, 69

[56] References Cited

U.S. PATENT DOCUMENTS

| | | |
|---|---|---|
| 3,663,245 | 5/1972 | Bryson . |
| 3,788,865 | 1/1974 | Babcock et al. . |
| 4,461,839 | 7/1984 | Rittler . |
| 4,525,462 | 6/1985 | Behr . |
| 4,526,872 | 7/1985 | Andrieu et al. . |
| 4,940,674 | 7/1990 | Beall et al. . |
| 5,010,041 | 4/1991 | Koyama et al. . |
| 5,070,043 | 12/1991 | Amundson, Jr. et al. . |
| 5,070,045 | 12/1991 | Comte et al. . |
| 5,179,045 | 1/1993 | Aitken et al. . |
| 5,212,122 | 5/1994 | Pannhorst . |
| 5,256,600 | 10/1993 | Pfitzenmaier . |

*Primary Examiner*—Karl Group
*Attorney, Agent, or Firm*—Milton M. Peterson; Clinton S. Janes, Jr.

[57] ABSTRACT

A colored, transparent glass-ceramic having a beta-quartz solid solution as its primary crystal phase, and a method of producing the glass-ceramic. The glass-ceramic is produced from a $Li_2O$—$Al_2O_3$—$SiO_2$ precursor glass containing an amount of $TiO_2$ effective as a nucleating agent up to about 6%, and having a color package composed of 10–20 ppm $Co_3O_4$, 550–650 ppm $Fe_2O_3$, 19.5–20.5% $Al_2O_3$ and 2.5–3.0% $Li_2O$.

8 Claims, 1 Drawing Sheet

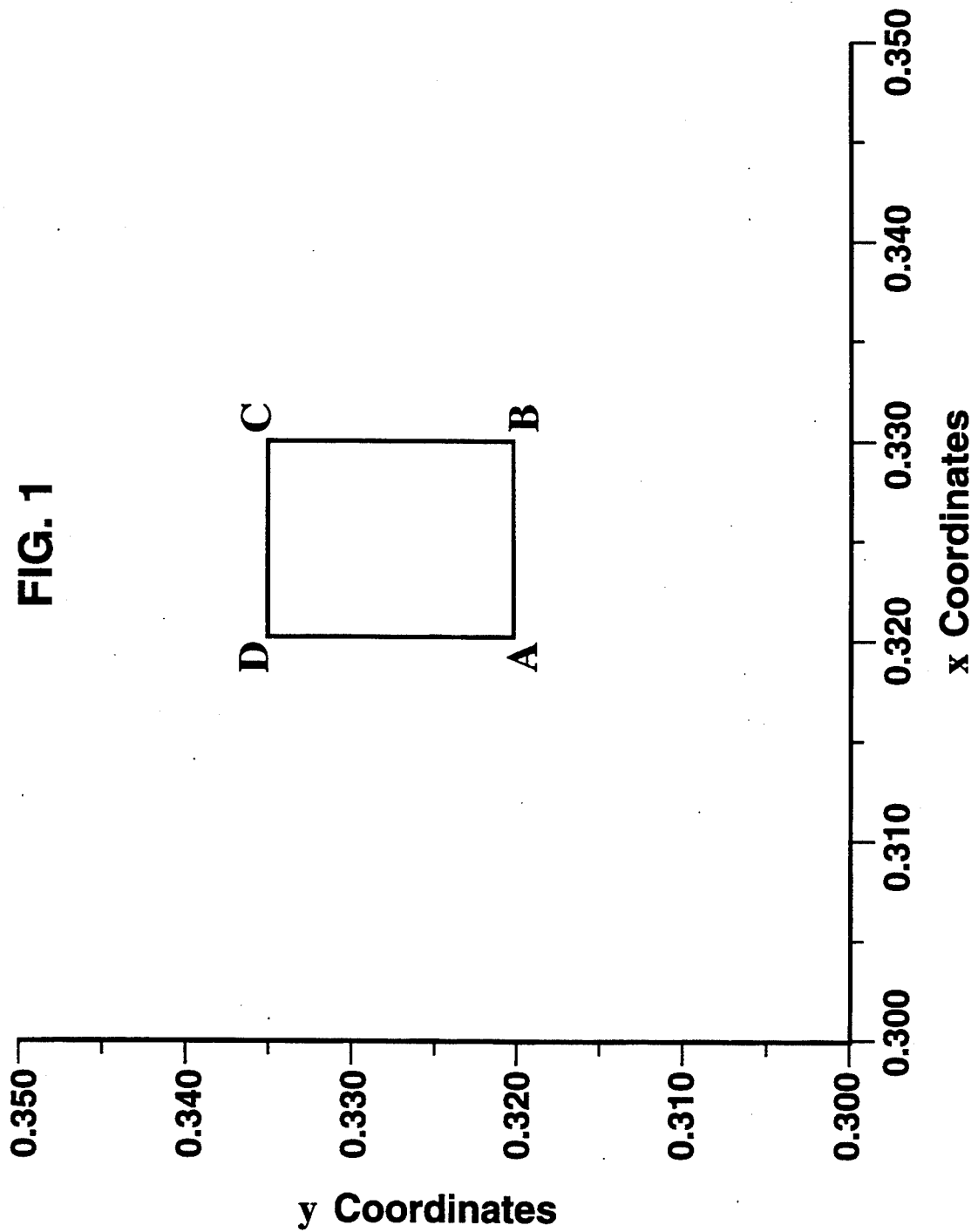

GLASS-CERAMICS AND COLOR PACKAGE

RELATED APPLICATION

U.S. application Ser. No. 08/258,268 is filed concurrently herewith by W. D. Amundson, Jr. under the title CHAMPAGNE COLORED GLASSES and assigned to the same assignee as the present application. It is directed to the production of clear transparent glasses which, in a thickness of 4 mm., exhibit a champagne color as defined by chromaticity coordinates (Illuminant C) within the ranges

| | |
|---|---|
| x | 0.3166–0.3281 |
| y | 0.3211–0.3305 |
| Y | 77–88. |

The glass consists essentially, by weight, of 0.05–0.25% iron oxide, expressed as $Fe_2O_3$, >25–175 ppm nickel oxide, expressed as NiO, and >10–100 ppm Se in a soda lime silicate base glass composition.

FIELD OF THE INVENTION

The field is glass-ceramic materials and production of colors therein.

BACKGROUND OF THE INVENTION

A glass-ceramic is a material having at least one crystalline phase thermally developed in a uniform pattern throughout at least a portion of a glass precursor. Glass-ceramics have been known for over 30 years since being described in U.S. Pat. No. 2,920,971 (Stookey). They find application in diverse areas, an area of particular interest being the fabrication of articles used in the preparation and serving of food. Such articles include cookware, bakeware, tableware and flat cooktops.

In general, production of a glass-ceramic material involves three major steps:

1. Melting a mixture of raw materials, usually containing a nucleating agent, to produce a glass.
2. Forming an article from the glass and cooling the glass below its transformation range.
3. Crystallizing ("ceramming") the glass article by an appropriate thermal treatment.

The thermal treatment usually involves a nucleating step at a temperature slightly above the transformation range. This is followed by heating to a somewhat higher temperature to cause crystal growth on the nuclei.

Crystallization of glasses in the $Li_2O$—$Al_2O_3$—$SiO_2$ composition field generally provides highly crystallized glass-ceramics. The primary crystal phase depends on glass composition and heat treatment. It may be a transparent beta-quartz solid solution, or an opaque beta-spodumene solid solution.

Beta-quartz is the hexagonal trapezohedral modification of $SiO_2$. It exhibits a slightly negative coefficient of thermal expansion (CTE). This makes it of particular interest where thermal cycling occurs, as in cookware. The basis of the beta-quartz solid solution is believed to be the substitution of $Al^{+3}$ ions for some of the $Si^{+4}$ ions in the beta-quartz structure. The attendant charge deficiency is made up by the introduction of a small ion, such as $Li^+$, $Mg^{+2}$, or $Zn^{+2}$, into the beta-quartz structure.

Beta-quartz solid solution glass-ceramics customarily contain $TiO_2$ as a nucleating agent. Optionally, the $TiO_2$ may be partially, or wholly, substituted for by $ZrO_2$. The appearance of such glass-ceramics can be varied by varying composition and/or heat treatment. Thus, transparent, translucent, or opaque glass-ceramics (which may be water-white, translucent, opaque white, or variously colored) are all possibilities as described in the prior art.

The widest use of $Li_2O$—$Al_2O_3$—$SiO_2$ glass-ceramic materials has been in the field of culinary ware. For over three decades, Corning Glass Works, now Corning Incorporated, has marketed opaque white cooking utensils under the trademark CORNING WARE. More recently, cooking utensils, formed from a transparent glass-ceramic exhibiting a light brown tint, were introduced commercially under the trademark VISIONS. In general, this transparent glass-ceramic is crystallized at lower temperatures to develop small, beta-quartz solid solution crystals.

It has been observed that transparent, beta-quartz glass-ceramics nucleated with $TiO_2$ tend to exhibit a light brown tint. This is ascribed to the presence of both $TiO_2$ and $Fe_2O_3$ in the parent glass composition. Efforts to achieve a different color, then, must take into consideration this inherent coloration effect.

U.S. Pat. No. 5,070,045 (Comte et al.) discloses transparent, glass-ceramic plates wherein the predominant crystal phase in the glass-ceramics is beta-quartz solid solution. These plates use 0.1–1.0% of a colorant selected from CoO, NiO, $Cr_2O_3$, $Fe_2O_3$, $MnO_2$, and $V_2O_5$. The patent is primarily concerned with $V_2O_5$ which contributes to minimal distortion while giving a black aspect in reflection and a reddish brown tint in transmission. The Comte et al. compositions consist essentially, in weight percent, as calculated on the oxide basis, of:

| | | | |
|---|---|---|---|
| $SiO_2$ | 65–70 | MgO + BaO + SrO | 1.1–2.3 |
| $Al_2O_3$ | 18–19.8 | $ZrO_2$ | 1.0–2.5 |
| $Li_2O$ | 2.5–3.8 | $As_2O_3$ | 0–1.5 |
| MgO | 0.55–1.5 | $Sb_2O_3$ | 0–1.5 |
| ZnO | 1.2–2.8 | $As_2O_3 + Sb_2O_3$ | 0.5–1.5 |
| $TiO_2$ | 1.8–3.2 | $Na_2O$ | 0–<1.0 |
| BaO | 0–1.4 | $K_2O$ | 0–<1.0 |
| SrO | 0–1.4 | $Na_2O + K_2O$ | 0–<1.0 |
| BaO + SrO | 0.4–1.4 | 2.8 $Li_2O$ + 1.2 ZnO | >1.8 |
| | | 5.2 MgO | |

U.S. Pat. No. 5,179,045 (Aitken et al.) describes production of a burgundy color in a glass-ceramic having as its primary crystal phase a beta-quartz solid solution. The glass-ceramic contains up to 6% $TiO_2$ as a nucleating agent. It has a color package composed of 50–150 ppm $CO_3O_4$, 50–250 ppm NiO and 400–1000 ppm Fe2O3 to provide the desired burgundy color.

U.S. Pat. No. 5,256,600 (Pfitzenmaier) describes a method of varying the color in a glass-ceramic material having a beta-quartz solid solution as the predominant crystal phase. The method comprises controlling the $Al_2O_3$ level between 19 and 20% by weight, the $Fe_2O_3$ level between 700 and 900 ppm and the $Co_3O_4$ level at not over 15 ppm in the glass melt. $Co_3O_4$ may be added to the molten glass in the forehearth to provide an amber color with 20–40 ppm $Co_3O_4$ and a burgundy color with 120–140 ppm.

The method makes it possible to obtain different colors, as well as the opaque product, with a single base glass composition for the precursor glass. That facilitates changing from one product to another with a single melting unit. It is further possible to melt one precursor base glass, and then provide subsequent treatments in the furnace forehearth to achieve the different colors.

The present invention arises from a desire to achieve a specific decorative color in a transparent, beta-quartz solid solution glass-ceramic. That color is softer and more neutral than the brownish tint inherent in the $TiO_2$-nucleated, beta-quartz glass-ceramic. It approximates the pale yellow of champagne.

SUMMARY OF THE INVENTION

The invention resides in part in a method of controlling the color in a glass-ceramic material having a beta-quartz solid solution as the predominant crystal phase which comprises controlling the $Al_2O_3$ level between 19.5 and 0.5%, the $Fe_2O_3$ level between 550 and 650 ppm, the $Co_3O_4$ level between less than 10 ppm and 20 ppm and the $Li_2O$ level between 2.5 and 3.0%.

The article of the invention is a colored, transparent glass-ceramic having a beta-quartz solid solution as its primary crystal phase, containing an amount of $TiO_2$ effective as a nucleating agent up to about 6%, and having a color package composed of 10–20 ppm $CO_3O_4$, 550–650 ppm $Fe_2O_3$, 19.5–20.5% $Al_2O_3$, and 2.5–3.0% $Li_2O$, and having a color defined by color coordinates of $x = 0.3200-0.3300$, $y = 0.3220-0.3350$ and $Y = 80-85$.

PRIOR ART

In addition to the patents mentioned in the Background section, attention is also directed to United States patents described in an accompanying document.

BRIEF DESCRIPTION OF THE DRAWING

The single FIGURE in the accompanying drawing is a graphical representation of chromaticity coordinates x and y (Illuminant C). The FIGURE further shows a color coordinate box defining the color achieved in accordance with the invention.

DESCRIPTION OF THE INVENTION

Our invention is based in large measure on our discovery of a unique color package for a transparent, beta-quartz solid solution glass-ceramic. The term color package indicates a combination of certain glass oxides, usually including transition metal oxides, in certain proportions. These oxides either produce, or control production of, particular colors in a material.

As indicated earlier, the precursor glass for a beta-quartz solid solution glass-ceramic generally has a lithia aluminosilicate ($Li_2O$—$Al_2O_3$—$SiO_2$) base composition. The glass further includes up to 6% by weight $TiO_2$ as a nucleating agent, with a portion of this, optionally, substituted by $ZrO_2$. The glass may also include an oxide of arsenic or antimony as a fining agent. Minor amounts of divalent metal oxides (MgO, CaO, ZnO) may be present as modifiers.

The present invention was developed employing the precursor glasses disclosed in the Comte et al.—045 patent. In developing the color package for the present glasses, it became necessary to make certain minor, but significant composition modifications. Accordingly, while not so limited in application, the invention is described with reference to the Comte et al. compositions, as modified.

The color package of the present invention, in percent by weight of the total glass, consists of:

| | |
|---|---|
| $Co_3O_4$ | 10–20 ppm |
| $Fe_2O_3$ | 550–650 ppm |
| $Al_2O_3$ | 19.5–20.5% |
| $Li_2O$ | 2.5–3.0% |
| $TiO_2$ | up to 6% |

The present color package functions in a different manner from that described in U.S. Pat. No. 5,256,600. In that patent, certain base glass components were controlled to provide greater sensitivity to coloring oxides. This reduced the volume of the colorants employed, as well as the number of different colorants required.

In the present case, certain base glass components are controlled to result in less color sensitivity in the base glass. This means that the modifications tend to decolorize, that is, neutralize the inherent color present. Thus, the brown color, characteristic of VISIONS cookware, is softened. This produces a pale amber that may have a yellow to pink cast depending on the cobalt oxide content in the package. In addition to their effect on color, the color package components may also affect other glass properties. Hence, they must be controlled to maintain these properties as well.

The presence of lithia ($Li_2O$) is essential to produce the beta-quartz crystal phase. Decreasing the $Li_2O$ level provides an improved liquidus-viscosity relationship. This, in turn, decreases the possibility of uncontrolled devitrification occurring during glass delivery. The reduced $Li_2O$, however, increases high temperature viscosity, which adversely affects the melting process. The $Li_2O$ decrease must be limited for this reason. A $Li_2O$ level of 2.5–3.0% by weight is, therefore, maintained.

The presence of substantial alumina ($Al_2O_3$) in the glass is necessary for crystal formation. Increasing the normal content not only lessens color sensitivity, but decreases high temperature viscosity. This tends to counter the effect of reducing the $Li_2O$ level. Increasing the $Al_2O_3$ level also permits maintaining higher iron oxide levels while maintaining a desired color. Accordingly, an $Al_2O_3$ level of 19.5–20.5% by weight is maintained.

The presence of iron oxide, as an impurity added with other batch materials, is inherent. The level has been maintained at about 900 ppm. This facilitated infra-red transmission, and consequent heat retention and transfer during glass melting. For present purposes, the $Fe_2O_3$ level must be decreased to reduce the intensity of the characteristic brown color imparted by this oxide. Accordingly, the level is maintained in the range of 550–650 ppm, preferably about 600 ppm.

A cobalt oxide ($Co_3O_4$) level of 10–20 ppm is maintained to provide a soft, less intense color in the glass. As the level is shifted between 10 and 20 ppm, the color shifts from a yellow shade to a pink shade of a soft amber.

The glass also contains up to 6% $TiO_2$ as a nucleating agent. This, like the iron oxide, imparts an inherent brown color to the glass. As discussed above, the present color package tends to decolorize, and thus softens, the intensity of this brown color.

The preferred compositions of the invention, as expressed in percent by weight on an oxide basis, consist essentially of:

| | | | |
|---|---|---|---|
| $SiO_2$ | 65–70 | SrO | 0–1.4 |

-continued

| | | | |
|---|---|---|---|
| $Al_2O_3$ | 19.5–20.5 | $BaO + SrO$ | 0.4–1.4 |
| $Li_2O$ | 2.5–3.0 | $As_2O_3$ | 0–1.5 |
| MgO | 0.5–1.5 | $Sb_2O_3$ | 0–1.5 |
| ZnO | 1.2–2.8 | $As_2O_3 + Sb_2O_3$ | 0.5–1.5 |
| $TiO_2$ | 1.8–3.2 | $Na_2O + K_2O$ | 0–<1.0 |
| $ZrO_2$ | 1.0–2.5 | $Co_3O_4$ | 10–20 ppm |
| BaO | 0–1.4 | $Fe_2O_3$ | 550–650 ppm |

In the accompanying drawing, the single FIGURE is a graphical representation of the invention employing the CIE chromaticity coordinate system using Illuminant C. In the FIGURE, x coordinates are plotted on the horizontal axis and y coordinates are plotted on the vertical axis. The polygon ABCDA encompasses coordinate value combinations that provide generally acceptable colors in accordance with the invention. The color coordinate value ranges for this area are:

x=0.3200 to 0.3300
y=0.3220 to 0.3350
Y=80–85

At the upper end of rectangle ABCDA (y=0.3350), colors having a yellowish cast are obtained. At the lower end, that is, at y values approaching 0.3220, a pinkish cast is obtained.

The color package may be introduced by incorporating components in their entirety in the batch fed to a melting unit. However, a real advantage is obtained by using a forehearth colorant additive system sometimes referred to as a colorcell.

The method and equipment used to add a colorant material to a molten glass in a forehearth are collectively referred to as a forehearth coloring system or a colorcell. Such systems (colorcells) have been in use for at least 30 years. They have been used primarily, however, to impart colors to soda lime glasses, in particular, green or blue colors to soda lime glass bottles. Currently, colorcells are employed to introduce two types of glass colorants: unmelted concentrated colorant in particulate form and melted color frits. The former is favored in the United States, while the latter is more popular in Europe.

The colorcell practice has been particularly useful in simultaneously producing an opaque, white CORNING WARE product and a product having a champagne color in accordance with the present invention. The presence of at least a few ppm of $Co_3O_4$, as a tramp impurity in other batch materials, is inevitable. However, an undesirable gray color is introduced into the white, opaque product with a $Co_3O_4$ level above about 10 ppm. Accordingly, it is desirable to maintain a low level in the glass tank. Then, the necessary $Co_3O_4$ level for a colored transparent glass can be achieved with a forehearth addition while the glass, as melted, is delivered from a second forehearth.

Both glass products are then cerammed, that is, heat treated to produce the desired glass-ceramic product. A typical schedule for the present transparent, colored product is:

1. Raise furnace temperature to 800° C. at 300° C./hour.
2. Hold between 800° C. and 850° C. for 30 minutes.
3. Raise to 900° C. at 300° C./hour.
4. Hold for 45–60 minutes at 900° C.
5. Cool at furnace rate to ambient.

The low level, $Co_3O_4$ glass, that is, the precursor for the white, opaque product, is cerammed on the same schedule with one exception. That exception is that the temperature is raised to 1150° C., rather than 900° C., in the third step. This higher temperature treatment causes conversion of the beta-quartz crystals to spodumene crystals, as well as crystal growth, thereby rendering the product opaque.

To produce a soft, yellow amber, champagne color, we prefer to employ the following composition, as calculated in weight percent on an oxide basis:

| | | | |
|---|---|---|---|
| $SiO_2$ | 68.6 | $Li_2O$ | 2.80 |
| MgO | 1.25 | $Al_2O_3$ | 20.00 |
| ZnO | 1.60 | $Fe_2O_3$ | 600 ppm |
| BaO | 0.80 | $Co_3O_4$ | 10 ppm |
| $TiO_2$ | 2.60 | | |
| $ZrO_2$ | 1.70 | | |
| $As_2O_3$ | 0.70 | | |

For a pink amber color, we prefer to increase the $Co_3O_4$ content to about 20 ppm. It will be appreciated that minor changes in these compositions may be necessary in scaling up for large commercial melts. Also, minor variations in the color package may become necessary to satisfy designer desires.

We claim:

1. A colored, transparent glass-ceramic having a beta-quartz solid solution as its primary crystal phase, containing an amount of $TiO_2$ effective as a nucleating agent up to about 6%, and having a color package composed of 10–20 ppm $CO_3O_4$, 550–650 ppm, $Fe_2O_3$, 19.5–20.5% $Al_2O_3$, and 2.5–3.0% $Li_2O$.

2. A glass-ceramic in accordance with claim 1 wherein the color is defined by color coordinates, based on CIE Illuminant C, x=0.3200–0.3300, y=0.3220–0.3350 and Cap Y=80–85.

3. A glass-ceramic in accordance with claim 1 wherein the glass-ceramic consists essentially of, as calculated in weight percent on an oxide basis:

| | | | |
|---|---|---|---|
| $SiO_2$ | 65–70 | SrO | 0–1.4 |
| $Al_2O_3$ | 19.5–20.5 | $BaO + SrO$ | 0.4–1.4 |
| $Li_2O$ | 2.5–3.0 | $As_2O_3$ | 0–1.5 |
| MgO | 0.5–1.5 | $Sb_2O_3$ | 0–1.5 |
| ZnO | 1.2–2.8 | $As_2O_3 + Sb_2O_3$ | 0.5–1.5 |
| $TiO_2$ | 1.8–3.2 | $Na_2O + K_2O$ | 0–<1.0 |
| $ZrO_2$ | 1.0–2.5 | $Co_3O_4$ | 10–20 ppm |
| BaO | 0–1.4 | $Fe_2O_3$ | 550–650 ppm. |

4. A glass-ceramic in accordance with claim 3 consisting of, as calculated in approximate weight percent on an oxide basis:

| | | | |
|---|---|---|---|
| $SiO_2$ | 68.6 | $ZrO_2$ | 1.7 |
| $Al_2O_3$ | 20.0 | BaO | 0.8 |
| $Li_2O$ | 2.8 | $As_2O_3$ | 0.7 |
| MgO | 1.25 | $Co_3O_4$ | 10–20 ppm |
| ZnO | 1.6 | $Fe_2O_3$ | 600 ppm |
| $TiO_2$ | 2.6. | | |

5. A method of controlling the color in a glass-ceramic material having a beta-quartz solid solution as the predominant crystal phase which comprises controlling the $Al_2O_3$ level between 19.5 and 20.5%, the $Fe_2O_3$ level between 550 and 650 ppm, the $Co_3O_4$ level between 10 and 20 ppm, and the $Li_2O$ level between 2.5 and 3.0%.

6. A method in accordance with claim 5 which further comprises melting a $Li_2O$—$Al_2O_3$—$SiO_2$ glass containing a color package consisting of:

| | |
|---|---|
| 10–20 ppm | $Co_3O_4$ |
| 550–650 ppm | $Fe_2O_3$ |
| 19.5–20.5% | $Al_2O_3$ |
| 2.5–3.0% | $Li_2O$. |

7. A method in accordance with claim 6 which further comprises heating the glass to a temperature of about 800° C., holding at 800°–850° C., heating to 900° C. and holding at that temperature to develop a beta-quartz crystal phase having a soft amber color.

8. A method in accordance with claim 6 which further comprises adding at least a portion of the $Co_3O_4$ content to the molten glass as it passes through a first forehearth, thereby enabling production of a glass with a different $Co_3O_4$ level from a second forehearth.

* * * * *

UNITED STATES PATENT AND TRADEMARK OFFICE
CERTIFICATE OF CORRECTION

PATENT NO. : 5,422,318
DATED : June 6, 1995
INVENTOR(S) : Hagg et al.

It is certified that error appears in the above-indentified patent and that said Letters Patent is hereby corrected as shown below:

Column 3, line 15, "0.5%" should be --20.5%-- and "Fe2O3" should be --$Fe_2O_3$--.

Column 3, line 23, "CO3O4" should be --$Co_3O_4$-- and "Fe2O3" should be --$Fe_2O_3$--.

Column 6, line 29, "CO3O4" should be --$Co_3O_4$--.

Column 6, lines 33-34, "y=0.32-20" should be --y=0.3220--.

Signed and Sealed this

Twenty-fourth Day of October, 1995

Attest:

BRUCE LEHMAN

Attesting Officer         Commissioner of Patents and Trademarks